United States Patent
Matsunaga et al.

(10) Patent No.: US 6,347,871 B2
(45) Date of Patent: Feb. 19, 2002

(54) ANITGLARE LAYER, ANTIGLARE FILM, AND OPTICAL ELEMENT

(75) Inventors: Takuya Matsunaga; Masayuki Satake; Shigeo Kobayashi; Hiroshi Shibata; Takashi Shouda, all of Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 09/837,495

(22) Filed: Apr. 18, 2001

(30) Foreign Application Priority Data

Apr. 19, 2000 (JP) .................................. 2000-117552

(51) Int. Cl.$^7$ .............................................. G02B 27/00
(52) U.S. Cl. ........................ 359/613; 359/614; 359/599; 359/443
(58) Field of Search ................................ 359/613, 614, 359/599, 443, 452, 461, 459, 494, 495; 349/104, 105, 122, 137

(56) References Cited

U.S. PATENT DOCUMENTS 5,847,795 A * 12/1998 Satoh et al. ................. 349/137
5,995,288 A * 11/1999 Kashima et al. ............. 359/599
6,111,699 A * 8/2000 Iwata et al. .................. 359/599
6,233,095 B1 * 5/2001 Niwa et al. .................. 359/443

FOREIGN PATENT DOCUMENTS

| JP | 2000-47010 | 2/2000 |
|----|-----------|--------|
| JP | 2000-121809 | 4/2000 |

* cited by examiner

Primary Examiner—Mohammad Sikder
(74) Attorney, Agent, or Firm—Knobbe, Martens, Olson and Bear, LLP

(57) ABSTRACT

The antiglare layer includes at least one resin coat layer (a) containing particles and a resin coat layer (b) laminated on said resin coat layer (a). The resincoat layer (b) contains particles and has a surface uneven configuration. An average particle size of the particles contained in the resin coat layer (b) is smaller than or equal to an average particle size of the particles contained in the resin coat layer (a), is capable of restraining the screen glaring phenomenon while maintaining the antiglare property and in which the whiting is observed to the least extent.

10 Claims, 1 Drawing Sheet

ANITGLARE LAYER, ANTIGLARE FILM, AND OPTICAL ELEMENT

BACKGROUND OF THE INVENTION

1. Field of the Invention

The present invention relates to an antiglare layer used for restraining a screen glaring phenomenon attributable to highly fine pixels in a liquid crystal display device or the like, a film having the antiglare layer, and an optical element provided with the antiglare film.

2. Description of the Background Art

Hitherto, in a display device such as a liquid crystal display device, an antiglare layer (having an antiglittering property) has been disposed on the uppermost surface of a panel for preventing reflection of an outside environment by diffusing surface reflection light and restraining the regular reflection of outside light, thereby to improve the visibility of images. A generally known example of such an antiglare layer is a layer obtained by sandblasting, or by filling a resin layer having a thickness of from 5 to 10 μm suitably with or transparent particles to impart a fine uneven structure on the surface thereof. In the case of highly fine liquid display device, however, when an antiglare layer such as described above is mounted thereon, a random intense-faint light is generated on the surface to aggravate the glaring, thereby inviting a problem of decrease in the image quality. In order to restrain such glaring, a method is proposed to dispose two or more of the aforesaid resin coats. Although such means can prevent the glaring phenomenon to some extent, the glaring phenomenon is not yet sufficiently restrained.

In addition, the aforementioned antiglare layer having a surface uneven configuration is effective in imparting the antiglare property in the case where an average crest-to-bottom interval is small to provide a dense structure, and the glaring phenomenon can be restrained to some extent. On the other hand, in the case of a structure having a dense surface uneven configuration, a phenomenon called "whiting" occurs in which the surface looks whity by random reflection of outside light on the surface layer. This leads to a problem of decrease in the visibility of black color display particularly in a display device such as a liquid display device.

An object of the present invention is to provide an antiglare layer, which is capable of restraining the screen-glaring phenomenon while maintaining the antiglittering property and in which the whiting is observed to the least extent. A further object of the present invention is to provide a film having the antiglare layer and an optical element provided with the antiglare film.

SUMMARY OF THE INVENTION

As a result of repeated eager studies to solve the aforementioned problems of the prior art, the inventors have found out that the aforesaid object can be achieved by an antiglare layer having a structure described below, thereby completing the present invention.

Namely, the present invention is directed to an antiglare layer comprising at least one resin coat layer (a) containing particles and a resin coat layer (b) laminated on the resin coat layer (a), the resin coat layer (b) containing particles and having a surface uneven configuration, wherein an average particle size of the particles contained in the resin coat layer (b) is smaller than or equal to an average particle size of the particles contained in the resin coat layer (a).

In the present invention, the antiglare layer is made of a laminate where the lower layer contains particles having a larger average particle size than that of the particles contained in the upper layer. As a consequence, light diffusion can be effectively carried out in each layer, thereby restraining the glaring phenomenon attributable to diffusion of backlight in a liquid crystal display device.

Further, the antiglare layer of the present invention is designed in such a manner that the average particle size of the particles contained in the upper layer in the aforesaid laminate structure is smaller than or equal to the average particle size of the particles contained in the lower layer so that the particles with a smaller average particle size appear in the upper layer. Such a design mitigates the denseness of the surface uneven configuration to some extent, increases the crest-to-bottom interval of the surface uneven configuration to some extent, and reduces the average slant angle, whereby the whiting can be restrained. In the present invention, since the glaring is restrained by the above-mentioned laminate structure, the glaring on the surface is not so conspicuous to cause decrease in the image quality or in the visibility of the display screen as in the case of restraining the whiting by an antiglare layer with a single-layer structure.

Further, the resin coat layer (a) constituting the lower layer of the antiglare layer in the present invention serves to improve the surface rubbing resistance and hardness.

In the aforesaid antiglare layer, a surface roughness of the surface uneven structure of the resin coat layer (b) is preferably from 14 to 60 μm, more preferably from 20 to 50 μm, in terms of an average crest-to-bottom interval.

When the average crest-to-bottom interval is within the above-mentioned range, the antiglaring property and the antiwhiting property is obtained a good balance, hence it is preferable. The average crest-to-bottom interval is more preferably less than or equal to 30 μm from the standpoint of the antiglittering property and the antiglaring property, and is preferably more than or equal to 30 μm from the standpoint of the antiwhiting property. Here, the average crest-to-bottom interval is a value measured by using a contact-type surface roughness meter under a condition with a trace distance of 3 mm and a speed of 0.3 mm/s.

In the aforesaid antiglare layer, the average particle size of the particles contained in the resin coat layer (b) is preferably from 1 to 6 μm, and the average particle size of the particles contained in the resin coat layer (a) is preferably from 2 to 10 μm.

The average particle sizes of the particles contained in the resin coat layer (a) and the resin coat layer (b) are not specifically limited as long as the average particle size of the particles contained in the resin coat layer (b) is relatively smaller than or equal to the average particle size of the particles contained in the resin coat layer (a). However, if the average particle sizes of the particles are respectively within the above-mentioned ranges, the antiglittering property, the antiglaring property, and the antiwhiting property of the antiglare layer can be effectively exhibited. The average particle size of the particles contained in the lower resin coat layer (a) is more preferably from 3 to 5 μm in order to obtain a light-diffusing effect more efficiently. The average particle size of the particles contained in the upper resin coat layer (b) is more preferably from 2 to 3 μm in order to exhibit the aforesaid surface uneven configuration and to restrain the whiting to the minimum.

Further, the antiglare layer preferably includes a reflection-preventive layer disposed on a surface of the uneven configuration of the resin coat layer (b), the reflection-preventive layer having a refractive index smaller than that of the resin coat layer (b).

The reflection-preventive layer having a small refractive index can restrain the surface reflection and reduces the whiting more effectively.

In addition, the present invention is also directed to an antiglare film including the aforesaid antiglare layer disposed on one side or on both sides of a transparent substrate. The present invention is also directed to an optical element including the aforesaid antiglare layer or the aforesaid antiglare film disposed on one side or on both sides of the optical element.

The antiglare layer of the present invention can be used for various fields of use as an antiglare film disposed on a transparent substrate, for example, in an optical element.

DESCRIPTION OF THE PREFERRED EMBODIMENTS

Figure 1:
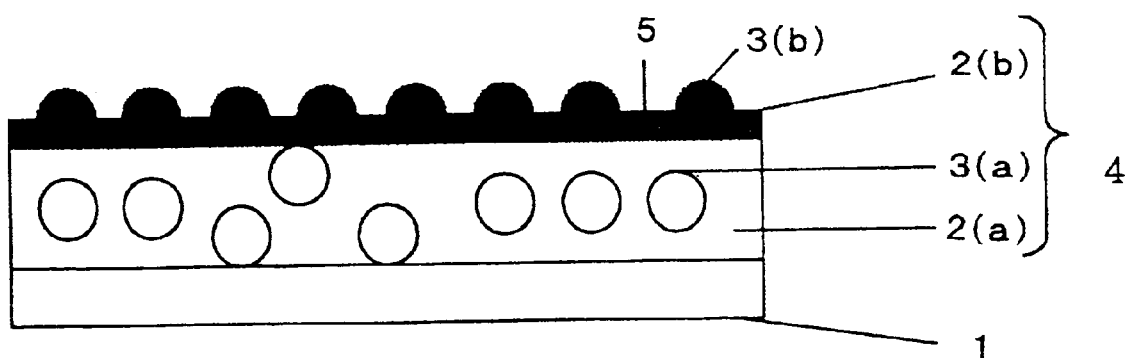
FIG. 1 is an illustration of an example of a film provided with an antiglare layer of the present invention.

Hereafter, preferred embodiments of the present invention will be described with reference to the attached drawings.

FIG. 1 illustrates an antiglare film in which an antiglare layer 4 is formed on a transparent substrate 1. In the antiglare layer 4, an upper resin coat layer 2(b) having a surface uneven configuration is formed on a lower resin coat layer 2(a). In FIG. 1, the shown lower resin coat layer 2(a) is made of a single layer; however, the resin coat layer 2(a) may be made of plural layers.

Particles 3(a) and 3(b) are contained in the resin coat layers 2(a) and 2(b). The particles 3(a) in the resin coat layer 2(a) may be in the inside of the layer or at the interface between the upper resin coat layer 2(b) and the resin coat layer 2(a), or at the interface between the transparent substrate 1 and the resin coat layer 2(a). The particles 3(b) in the resin coat layer 2(b) form an uneven configuration on the surface of the antiglare layer.

The resins constituting the resin coat layers 2(a) and 2(b) may be, for example, an ultraviolet-curing resin. The ultraviolet-curing resin may be one of a variety of resins including polyester-type resins, acryl-type resins, urethane-type resins, amide-type resins, silicone-type resins, and epoxy-type resins, and maybe amonomer, an oligomer, a polymer, or the like of ultraviolet-curing type. A preferably-used ultraviolet-curing resin may be, for example, one having an ultraviolet-polymerizing functional group, in particular, one containing an acryl-type monomer or oligomer having two or more ultraviolet-polymerizing functional groups, particularly from three to six of such functional groups, as a component. The ultraviolet-curing type resin may contain an ultraviolet polymerization initiator. Here, the resins constituting the resin coat layer 2(a) and 2(b) may be the same or different.

Examples of the particles 3(a) and 3(b) include inorganic particles which may be electroconductive such as silica, alumina, titania, zirconia, calcium oxide, tin oxide, indium oxide, cadmium oxide, and antimony oxide, crosslinked or non-crosslinked organic particles made of various polymers such as poly(methyl methacrylate) or polyurethane, silicone-type particles, and others. One or more suitable kinds of these particles may be used either alone or in combination. Here, the particles 3(a) and 3(b) may be the same or different.

The transparent substrate 1 may be a film made of a transparent polymer. Examples of the polymers for forming the transparent substrate 1 include polyester-type polymers such as poly(ethylene terephthalate) and poly(ethylene naphthalate); cellulosic-type polymers such as diacetylcellulose and triacetylcellulose; polycarbonate-type polymers; acryl-type polymers such as poly(methyl methacrylate); styrene-type polymers such as polystyrene and acrylonitrile-styrene copolymer; olefinic-type polymers such as polyethylene, polypropylene, cyclo-type polyolefins, poly-olefins having a norbornene structure, and ethylene-propylene copolymer; vinyl chloride-type polymers; amide-type polymers such as nylon and aromatic polyamides; imide-type polymers; sulfone-type polymers; polyether sulfone-type polymers; polyetheretherketone-type polymers; polyphenylene sulfide-type polymers; vinylalcohol-type polymers; vinylidene chloride-type polymers; vinyl butyral-type polymers; allylate-type polymers; polyoxymethylene-type polymers; epoxy-type polymers; and blends of the above-mentioned polymers.

The thickness of the transparent substrate 1 may be appropriately determined and is typically from about 10 to about 500 $\mu$m from the standpoints of the strength, the workability such as a handling property, and the layer thinness. The thickness of the transparent substrate 1 is preferably from 30 to 300 $\mu$m, more preferably from 50 to 200 $\mu$m.

The aforesaid antiglare film may be produced as follows. First, a resin (ultraviolet-curing resin, application solution) containing particles 3(a) is applied onto the transparent substrate 1, followed by drying and curing to form a resin coat layer 2(a). And, a resin (ultraviolet-curing resin, application solution) containing particles 3(b) is applied, followed by drying and curing to form a resin coat layer 2(b) having a surface uneven configuration.

Applying the application solution onto the transparent substrate 1 by a suitable method such as the doctor blade method or the gravure roll coater method may form the resin coat layer 2(a). The ratio of the particles 3(a) contained in the application solution is not particularly limited; however, the ratio is preferably from 5 to 20 parts by weight with respect to 100 parts by weight of the resin, from the standpoint of the antiglaring property. The thickness of the resin coat layer 2(a) is not particularly limited; however, the thickness is preferably from about 3 to about 10 $\mu$m, more preferably from 3 to 5 $\mu$m.

The surface uneven configuration of the resin coat layer 2(b) may be formed, for example, by a method of applying the application solution by a suitable method such as the doctor blade method or the gravure roll coater method so that the particles 3(b) contained in the resin constituting the resin coat layer 2(b) contribute to form the surface uneven configuration, as illustrated in FIG. 1. The surface uneven configuration can also be formed by surface roughening of the surface of the transparent substrate 1 by a suitable method such as sandblasting, emboss rolling, or etching, and successively applying the application solution on the roughened surface.

The ratio of the particles 3(b) contained in the application solution is not particularly limited; however, the ratio is preferably from 2 to 18 parts by weight with respect to 100 parts by weight of the resin, from the standpoint of the balance between the antiglaring property and the antiwhiting property. The thickness of the resin coat layer 2(b) is not particularly limited; however, the thickness is preferably equal to or smaller than the average particle size of the particles 3(b) contained in the resin coat layer 2(b).

A reflection-preventive layer 5 may be disposed on the surface of the uneven configuration of the resin coat layer (b), which is the uppermost surface of the antiglare layer, as illustrated in FIG. 1. The reflection-preventive layer 5 has a refractive index smaller than that of the resin coat layer (b) and may be made, for example, of fluorine-containing polysiloxane. The thickness of the reflection-preventive layer 5 is not particularly limited; however, the thickness is preferably from about 0.05 to 0.3 μm, more preferably from 0.1 to 0.3 μm.

Furthermore, an optical element (not illustrated) may be attached to the antiglare film of FIG. 1. The optical element may be, for example, a polarizing plate or a phase difference plate, and these may be used as a laminate. The optical element can be attached via a suitable adhesive layer, which is excellent in transparency and weathering resistance, such as an acryl-type, rubber-type, or silicone-type adhesive or a hot-melt-type adhesive, in accordance with the needs.

Examples of the polarizing plate include a film obtained by adsorbing iodine or a dichroic substance, e.g. a dichroic dye, onto a hydrophilic polymer film such as a poly(vinyl alcohol)-type film, a film of poly(vinyl alcohol)-type which has undergone partial conversion into formal, or a film of a partially saponified ethylene-vinyl acetate-type copolymer, and then stretching the film. Examples of the polarizing plate further include a polarizing film of dehydrated poly(vinyl alcohol) and a polarizing film of dehydrochlorinated poly (vinyl chloride). Examples of the phase difference plate include a uniaxially or biaxially stretched film of a polymer film exemplified in the aforementioned transparent substrate, and a liquid crystal polymer film. The phase difference plate may be formed as a laminate of two or more layers of stretched film. Laminating a polarizing plate and a phase difference plate can form an elliptic polarizing plate.

EXAMPLES

Hereafter, examples of the present invention showing the construction and the effects of the present invention will be described. Here, parts and percentage (%) in each example refer to parts and percentage (%) by weight, unless otherwise specifically mentioned.

Example 1
(Formation of Resin Coat Layer (a))

An application solution with a concentration of 40% of solid components, which was obtained by mixing 6 parts of silica spherical particles having an average particle size of 3.0 μm and 0.5 part of a benzophenone-type photopolymerization initiator with respect to 100 parts of an ultraviolet-curing resin (urethane acrylate-type monomer) by means of toluene, was applied onto a triacetylcellulose film (80 μm). After drying, the film was subjected to curing by ultraviolet radiation to form a coat film (4 μm) having a flat surface.
(Formation of Resin Coat Layer (b))

Further, an application solution with a concentration of 30% of solid components, which was obtained by mixing 14 parts of silica spherical particles having an average particle size of 2.0 μm and 0.5 part of a benzophenone-type photopolymerization initiator with respect to 100 parts of an ultraviolet-curing resin (urethane acrylate-type monomer) by means of toluene, was applied onto the aforesaid coat film. After drying, the film was subjected to curing by ultraviolet radiation to form a coat film (1.5 μm) having a surface uneven configuration with an average crest-to-bottom interval of 20.1 μm, thereby producing an antiglare film having a two-layer structure.

Examples 2 to 6, and Comparative Examples 1 to 2

An antiglare film having a two-layer structure was produced in the same manner as in Example 1 except that the average particle size and/or the amount of use of the silica spherical particles for forming the resin coat layers (a) and (b) were changed to those shown in Table 1. The average crest-to-bottom interval of the surface uneven configuration is shown in Table 1.

Example 7

Fluorine-containing polysiloxane was applied onto an uneven configuration part of the uppermost surface of the antiglare film obtained in Example 1, thereby to produce an antiglare film having a reflection-preventive layer of 0.1 μm thickness disposed thereon.

Comparative Example 3

The resin coat layer (b) was formed without forming the resin coat layer (a) in Example 1, thereby to produce an antiglare film having a single-layer structure.

A film obtained by bonding a polarizing plate (185 μm) to the antiglare film of each of Examples and Comparative Examples was bonded to a glass substrate. On a mask pattern (with an aperture ratio of 25%) fixed to a light table, a degree of glaring (antiglaring property) was evaluated by eye inspection with the following standard. Further, a black tape was stuck onto the surface of the glass substrate opposite to the surface having the polarizing plate bonded thereto, and the whiting (antiwhiting property) was evaluated by eye inspection with the following standard. Each evaluation is a relative evaluation with "X" representing the case in which the antiglare film of Comparative Example 5 was used. The results are shown in Table 1.

(Antiglaring Property)

⊙ . . . no glaring at all
○ . . . little glaring
Δ . . . some glaring but raising no practical problem
X . . . significant glaring (Antiwhiting Property)

⊙ . . . no whiting at all
○ . . . little whiting
Δ . . . some whiting but raising no practical problem
X . . . significant whiting

TABLE 1

| | Particles of resin coat layer (a) | | Particles of resin coat layer (b) | | Average crest-to-bottom interval (μm) | Antiglaring property | Antiwhiting property |
|---|---|---|---|---|---|---|---|
| | (Parts) | Average particle size (μm) | (Parts) | Average particle size (μm) | | | |
| Example 1 | 6 | 3 | 14 | 2 | 20.1 | ○ | ○ |
| Example 2 | 12 | 3 | 14 | 2 | 31.5 | ⊚ | ○ |
| Example 3 | 6 | 3 | 12 | 2 | 46.6 | ○ | ○ |
| Example 4 | 6 | 3 | 12 | 3 | 40.5 | ○ | ○ |
| Example 5 | 6 | 3 | 16 | 2 | 15.0 | ○ | Δ |
| Example 6 | 6 | 3 | 10 | 2 | 53.2 | Δ | ○ |
| Example 7 | 6 | 3 | 14 | 2 | 20.1 | ○ | ○ |
| Comparative Example 1 | 0 | — | 14 | 2 | 30.1 | x | ○ |
| Comparative Example 2 | 6 | 1.5 | 14 | 2 | 30.5 | x | ○ |
| Comparative Example 3 | None | | 14 | 2 | 20.1 | x | ○ |

What is claimed is:

1. An antiglare layer comprising:

at least one resin coat layer (a) containing particles; and a resin coat layer (b) laminated directly on said resin coat layer (a), said resin coat layer (b) containing particles and having a surface uneven configuration, wherein an average particle size of the particles contained in the resin coat layer (b) is smaller than an average particle size of the particles contained in the resin coat layer (a).

2. The antiglare layer of claim 1, wherein a surface roughness of the surface uneven structure of the resin coat layer (b) is from 14 to 60 μm in terms of an average crest-to-bottom interval.

3. The antiglare layer of claim 1, wherein the average particle size of the particles contained in the resin coat layer (b) is from 1 to 6 μm, and the average particle size of the particles contained in the resin coat layer (a) is from 2 to 10 μm.

4. The antiglare layer of claim 1, further comprising a reflection-preventive layer disposed on a surface of the uneven configuration of the resin coat layer (b), said reflection-preventive layer having a refractive index smaller than that of the resin coat layer (b).

5. An antiglare film comprising an antiglare layer of claim 1 disposed on one side or on both sides of a transparent substrate.

6. An antiglare film comprising an antiglare layer of claim 4 disposed on one side or on both sides of a transparent substrate.

7. An optical element comprising an antiglare layer of claim 1 disposed on one side or on both sides of the optical element.

8. An optical element comprising an antiglare layer of claim 4 disposed on one side or on both sides of the optical element.

9. An optical element comprising an antiglare film of claim 5 disposed on one side or on both sides of the optical element.

10. An optical element comprising an antiglare film of claim 6 disposed on one side or on both sides of the optical element.

* * * * *